Jan. 28, 1941.   H. E. HOLLMANN   2,229,699
ELECTROCARDIOGRAPHIC SYSTEM
Filed July 14, 1937
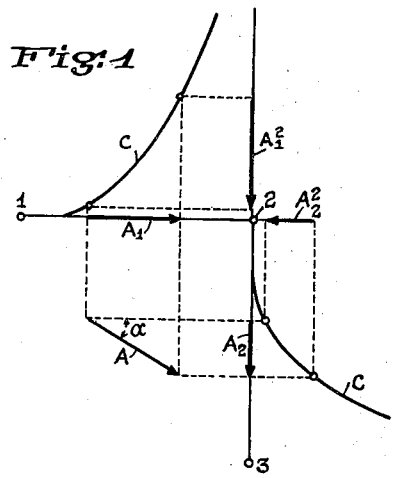
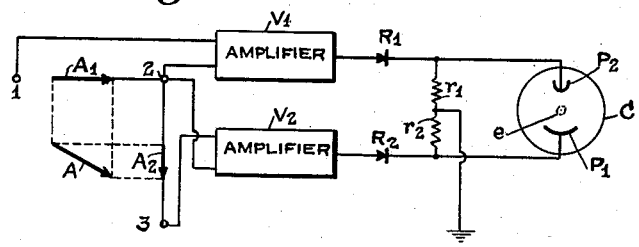
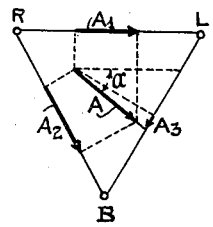
INVENTOR.
Hans Erich Hollmann
BY
ATTORNEY.

Patented Jan. 28, 1941

2,229,699

UNITED STATES PATENT OFFICE 2,229,699

ELECTROCARDIOGRAPHIC SYSTEM

Hans Erich Hollmann, Berlin-Lichterfelde, Germany, assignor to Radio Patents Corp., New York, N. Y., a corporation of New York Application July 14, 1937, Serial No. 153,501
In Germany October 26, 1936

9 Claims. (Cl. 128—2.06)

My invention relates to electrocardiographs, more particularly to a novel system for and method of producing electrocardiographic records.

As is well known, the operation of an electrocardiograph is based upon the fact that the exciting action of the heart in the human body is accompanied by voltage impulses of the order of about .001 volt between the limbs. By studying the characteristics of such impulses and their recording as continuous curves on a light sensitive surface such as the screen of an electric oscillograph, a photographic film or paper, physicians are enabled to determine valuable facts concerning the condition of the heart.

From the beginnings of electrocardiography it has been endeavored to eliminate the influence of the variations of the instantaneous position of the electrical axis of the heart and its rotation during each heart beat cycle upon the electrocardiograms or in other words, to obtain a "normal" electrocardiogram substantially independently of the position of the arbitrarily chosen tapping points of the body of a patient from which the action potentials are drawn. The first attempts in this respect led to the Einthoven tapping system based on an equi-lateral voltage triangle or three-pole system and still forming the basis for the recording and evaluation of electrocardiographic records at the present day. According to this principle, three electrocardiograms are obtained in place of a single "normal" electrocardiogram by means of which the instantaneous position of the electrical axis of the heart and its rotation during each action cycle may be reconstructed by forming the resultant of all three action potentials. Recently the Lissajou method of simultaneously recording two or three action potentials deflecting the same recording beam in different directions has been adapted for this purpose.

If, on the other hand, it is desired to compare the peaks or instantaneous values of a single action voltage curve derived from a single pair of tapping points and to study their quantitative relation, it should be considered that a simple electrocardiogram does not represent the true potential resultants of the heart action due to the fact that the angle enclosed by the electrical axis of the heart with the connecting line of the tapping points at each instant is an unknown quantity. It is not possible to eliminate this error or distortion caused thereby by a fixed multiplying factor since the latter would have to include the cosine of the angle formed by the heart axis with the line connecting the tapping points chosen for recording a particular electrocardiograms. Since this angle is not constant, but varies during the rotation of the electrical axis of the heart, a different relationship prevails for each individual peak or instantaneous value in the electrocardiogram, thus making it impossible to effect a quantitative evaluation and comparison of the records obtained in this manner. As a result, false diagnoses may be obtained liable to be of grave consequence to the patient.

It is an object of the present invention to avoid the above difficulty and uncertainty and to eliminate reactions upon or distortions of the electrocardiogram caused by the instantaneous position and rotation of the heart's electrical axis during each heart beat cycle.

By the new proposed method a "normal" electrocardiogram is obtained enabling directly a quantitative comparison and evaluation of the instantaneous or peak values of an electrocardiogram for diagnosing purposes.

The invention will become more apparent from the following detailed description taken with reference to the accompanying drawing forming part of this specification and wherein Figure 1 is a diagram explanatory of the principle underlying the invention, Figure 2 illustrates schematically a circuit arrangement showing one way of carrying out the invention, and Figure 3 represents a further diagram illustrating a modified tapping system suitable for use in connection with the invention.

Referring more particularly to Figure 1, points 1, 2 and 3 represent the tapping points applied to the body of a patient, in the example illustrated preferably to the breast by means of suitable connectors in a manner well known. $A_1$ represents the action voltage drawn from the points 1 and 2, and $A_2$ represents the action voltage drawn from the points 2 and 3, the connecting line of the latter forming a right angle with the connecting line of points 1 and 2 in the example illustrated in the manner of a two-phase multi-pole system. A represents the resultant voltage or the electrical vector of the heart whose instantaneous length or value being proportional to the resultant action voltage generated at the particular instant of the heart beat cycle enables the drawing of valuable conclusions on the condition of the heart in accordance with known electro-cardiographic evaluation and interpreting methods. The angle enclosed by the vector A with the horizontal tapping $A_1$ is designated by $\alpha$. In an arrangement of this type, the action voltage components derived from the tappings 1—2 and 2—3 are represented by the following equations:

$$A_1 = A \cos \alpha \quad \text{(I)}$$
$$A_2 = A \sin \alpha \quad \text{(II)}$$

From these equations wherein $A$ and $\alpha$ are unknown quantities, $A$ may be determined by a squaring and adding operation as follows:

$$A_1^2 + A_2^2 = A^2 (\sin^2 \alpha + \cos^2 \alpha) = A^2 \quad \text{(III)}$$

In this manner the angle $\alpha$ is eliminated and in order to obtain $A$ it is necessary to extract the square root of the above sum of the squares $A_1$ and $A_2$. It is possible, therefore, by means of this analytical method to determine the magnitude action potential vector of the heart independently of its instantaneous position or rotation during a beat or action cycle. An electrocardiogram obtained in this manner permits of a quantitative comparison of its individual peaks or instantaneous values leading to more accurate results and conclusions as compared with the electrocardiograms heretofore obtained in the art.

The above described analytical method of squaring, adding and extracting the square root may be carried out purely numerically by measuring the individual peaks or instantaneous values of the curves obtained from two tappings arranged as shown in Figure 1 or according to any other system and thereafter determining the values of $A$ for each value of the coordinates in accordance with the above method. In the medical practice however this method is complicated and cumbersome, not to mention the fact that substantial errors may occur during the numerical evaluation liable to result in false diagnoses and grave consequences to the patient. A more reliable method consists in the employment of a pantograph-like device for evaluating or converting the action voltage components, comprising two legs each adapted for tracing one of the action voltage curves and a stylus adapted to directly record a "normal" electro-cardiogram through suitably shaped cams or the like. However, the practical use of such an instrument requires a certain skill and experience not possessed by every physician.

By an arrangement and method according to the invention, the above described intermediate converting steps and calculations are carried out entirely automatically resulting in the direct recording of a "normal" electro-cardiogram representing the exact voltage resultants produced by the exciting action of the heart at each instant of a beat or exciting cycle and enabling an accurate and reliable quantitative evaluation and interpretation by a physician for diagnosing purposes.

A practical arrangement for carrying out the invention is shown diagrammatically in Figure 2. The action potentials $A_1$ and $A_2$ obtained from a tapping system which may be similar to that shown in Figure 1 are impressed upon individual amplifiers $V_1$ and $V_2$, respectively, and the amplified potentials applied to rectifiers $R_1$ and $R_2$. The latter are chosen to have a square law input-output characteristic such as shown at C in Figure 1 i. e. the curve C forms a portion of the arc of a parabola. Rectifiers with such a square law characteristic are well known in the art and may have the form of a discharge tube such as a standard triode or electron tube of the variable mu or remote cut-off type. If the characteristic curves of the tubes used do not exactly follow a square law relation, the exponent of the characteristic may be modified to be exactly equal to 2 by the employment of a direct current reaction in a manner well known. The outputs of the rectifiers are impressed upon a pair of impedance devices such as ohmic resistors $r_1$ and $r_2$ connected in series and having their junction point grounded in the example illustrated. Thus, the potential drops across the resistors $r_1$, $r_2$ are proportional to $A_1^2$ and $A_2^2$ and the sum of the latter is obtained between the outer terminals of the resistors connected to an oscillographic recording device such as a cathode ray oscillograph C provided in the example illustrated. The potentials must be in opposite phase relation in order to obtain their sum at the output terminals of $r_1$ and $r_2$ as is readily understood.

In an arrangement of this type $A^2$ is recorded as a function of time. In order to avoid a quadratic scale division for direct calibration in values of $A$, an amplifying tube may be provided ahead of the oscillograph having a characteristic curve varying according to an exponential law with an exponent equal to ½ thereby automatically effecting an extraction of the square root and resulting in the direct recording of a "normal" electro-cardiogram.

An alternative solution consists in the employment of an oscillograph constructed to have a deflecting sensitivity varying according to an exponential function with an exponent equal to ½. The latter may be obtained in the case of an electro-magnetic oscillograph by a suitable configuration of the magnetic deflecting field such as by properly shaping the magnet pole pieces. In the case of a cathode ray oscillograph an exponential relationship of the required character is obtained by the employment of suitably shaped electrostatic deflecting members $P_1$, $P_2$ for deflecting the electron ray $e$ in a direction at right angles to the time axis. For the latter purpose one of the deflecting members has the form of a curved plate with a small curvature and the other deflecting member has the form of a curved plate with a large curvature such as shown in the drawing. In this manner an exponential deflecting law with an exponent equal to ½ i. e. a cathode ray oscillograph having a deflecting sensitivity varying according to the square root of the deflecting potential may be obtained in a simple manner. Both electrodes $P_1$ and $P_2$ are connected to the resistors $r_1$ and $r_2$ in such a manner that the electron beam $e$ is deflected in accordance with the sum $A_1^2 + A_2^2$ of the potentials developed across the resistors. In addition, due to exponential relationship of the deflection, the cathode ray will directly record a "normal" electro-cardiogram on the basis of the above equation, that is to say independently of the angle or instantaneous position of the electrical heart vector during a heart beat cycle.

The method described on the basis of Figure 1 as applied to two action potentials supplied from a pair of tappings at right angle to each other may also be employed for three leads of which those related according to the Einthoven tapping system are of special interest. As is well known, according to the latter, three action potentials are drawn from the body, viz. I between the right hand and the left hand, II between the right hand and one of the legs such as the left leg, and III between the left hand to the left leg. The leads thus arranged may be regarded as the sides of an equilateral triangle or as a concatenated delta-connected three-pole system and if the three tapped potentials are recorded simultaneously and combined such as disclosed in my co-pending patent application Ser. No. 148,326 filed June 15, 1937, the instantaneous position and rotation of the electrical heart vector may be directly recorded. If a single tapped potential or electrocardiogram is desired for quantitative comparison and evaluation of the instantaneous values or peaks, the effect of the variation of the instantaneous position and rotation of the electrical heart vector may be eliminated by a recording system and method similar to that described hereinabove as will be understood more clearly from the following theoretical analysis. In the Einthoven diagram as shown in Figure 3, the three action voltages are represented by the following equations:

$$A_1 = A \cos \alpha \qquad (IV)$$

$$A_2 = A \cos (60° - \alpha) = \frac{A}{2}(\sqrt{3} \sin \alpha + \cos \alpha) \qquad (V)$$

$$A_3 = A \cos (120° - \alpha) = \frac{A}{2}(\sqrt{3} \sin \alpha - \cos \alpha) \qquad (VI)$$

by forming the sum of $A_2^2$ and $A_3^2$ the following is obtained:

$$A_2^2 + A_3^2 = \frac{A^2}{2}(3 \sin^2 \alpha + \cos^2 \alpha)$$

or since $\sin^2 \alpha = 1 - \cos^2 \alpha$:

$$A_2^2 + A_3^2 = \frac{A^2}{2}(3 - 3 \cos^2 \alpha + \cos^2 \alpha)$$

$$= \frac{A^2}{2}(3 - 2 \cos^2 \alpha) \qquad (VII)$$

From Equation IV there follows:

$$\cos^2 \alpha = A_1^2 / A^2 \qquad (VIII)$$

the latter inserted in VII results in the following:

$$A_2^2 + A_3^2 = \frac{A^2}{2}(3 - 2 A_1^2/A^2) = \frac{1}{2}(3A^2 - 2A_1^2) \qquad (IX)$$

or finally:

$$A^2 = \frac{2}{3}(A_1^2 + A_2^2 + A_3^2) \qquad (X)$$

From the above it is seen that it is possible to obtain a "normal" electrocardiogram from the three standard tappings between the limbs in accordance with the Einthoven diagram independently of the instantaneous position and rotation of the electrical heart axis. The summation of the squared potentials is not as simple as in the case of two tappings described previously. Preferably, the summation is carried out by a series connection of the output impedances of the rectifiers and the resultant potential thus obtained is applied to the deflecting plates of the oscillograph in substantially the same manner as described hereinabove.

By the arrangement and method described, it is thus possible to eliminate the influence of the rotation of the heart with respect to a frontal plane through the body on the instantaneous magnitudes of the heart voltage being recorded. In order to completely eliminate the influence of the instantaneous variation of the electrical heart vector in space according to a further feature of the invention, at least one of the action voltages is drawn from tappings applied between the breast and the back of the patient whereby reactions caused by the rotation of the heart with respect to a plane at right angle to the frontal plane may be eliminated in a manner substantially similar to that described hereinabove.

It will be evident from the above that the invention is not limited to the specific steps and arrangements of parts and connections disclosed and shown in the drawing for illustration but that the underlying novel concept and principle of the invention is susceptible of numerous modifications and variations coming within the broader scope of the invention as defined in the appended claims.

I claim:

1. An electrocardiographic recording system comprising means for drawing a plurality of component action voltages from tapping points on the body of a patient enclosing the heart and being related to each other in the manner of a multi-phase electric system, whereby the vectorial resultant of the voltages drawn is representative of the instantaneous resultant electrical vector of the action potentials generated by the heart action, means for producing voltages having instantaneous magnitudes varying according to the square of the instantaneous magnitudes of said component action voltages, means for additively combining the squared action voltages, and oscillograph means for recording the magnitude of said combined voltage at each instant during the cardiac cycle.

2. An electrocardiographic recording system comprising means for drawing a plurality of component action voltages from tapping points on the body of a patient enclosing the heart and being related to each other in the manner of a multi-phase electric system, whereby the vectorial resultant of the voltages drawn is representative of the instantaneous resultant electrical vector of the action potentials generated by the heart action, means for producing voltages having instantaneous magnitudes varying according to the square of the instantaneous magnitudes of said component action voltages, means for additively combining the squared action voltages, oscillograph means for recording the magnitude of said combined voltage at each instant during the cardiac cycle, and further means whereby the instantaneous magnitudes recorded by said oscillograph means vary proportionately to the square root of the instantaneous magnitudes of said combined voltage.

3. An electrocardiographic recording system comprising means for drawing a plurality of component action voltages from tapping points on the body of a patient enclosing the heart and being related to each other in the manner of a ring-connected multi-phase electric system, whereby the vectorial resultant of the voltages drawn from each two adjacent tapping points is representative of the instantaneous resultant vector of the action potentials generated by the heart action, a plurality of square law rectifiers each arranged to be energized by one of said component voltages, means for additively combining the rectified action voltages, and oscillograph means for recording the magnitude of said combined voltage at each instant during the cardiac cycle.

4. An electrocardiographic recording system comprising means for drawing a plurality of component action voltages from tapping points on the body of a patient enclosing the heart and being related to each other in the manner of a ring-connected multi-phase electric system, whereby the vectorial resultant of the voltages drawn from each two adjacent tapping points is representative of the instantaneous resultant vector of the action potentials generated by the heart action, a plurality of square law rectifiers each arranged to be energized by one of said component voltages, means for additively combining the rectified action voltages, oscillograph means for recording the magnitude of said combined voltage at each instant during the cardiac cycle, said oscillograph means having a deflecting sensitivity varying proportionately to the square root of the instantaneous magnitude of the deflecting potential.

5. An electrocardiographic recording system comprising means for drawing a pair of component action voltages from each two of three points on the body of a patient encircling the heart and forming the sides of a right-angled triangle, means for producing voltages having instantaneous magnitudes varying according to the square of the instantaneous magnitudes of said component action voltages, means for additively combining the squared action voltages, and oscillograph means for recording the magnitudes of said combined voltage at each instant during the cardiac cycle.

6. An electrocardiographic recording system comprising means for drawing a pair of component action voltages from each two of three tapping points on the body of a patient encircling the heart and forming the sides of a right-angled triangle, a pair of square law rectifiers arranged to rectify each of the action voltages drawn, means for additively combining the rectified action voltages, and oscillograph means for recording the magnitudes of said combined voltage at each instant during the cardiac cycle.

7. An electrocardiographic recording system comprising means for drawing a pair of component action voltages from each two of three tapping points on the body of a patient encircling the heart and forming the sides of a right-angled triangle, a pair of square law rectifiers arranged to rectify each of the action voltages drawn, means for additively combining the rectified action voltages, oscillograph means for recording the magnitudes of said combined voltage at each instant during the cardiac cycle, and further means whereby the instantaneous magnitudes recorded by said oscillograph means vary proportionately to the square root of the instantaneous magnitudes of said combined voltage.

8. An electrocardiographic recording system comprising means for drawing a pair of component action voltages from each two of three tapping points on the body of a patient encircling the heart and forming the sides of a right-angled triangle, a pair of square law rectifiers arranged to rectify each of the action voltages drawn, means for additively combining the rectified action voltages, oscillograph means for recording the magnitudes of said combined voltage at each instant during the cardiac cycle, said oscillograph means having a deflecting sensitivity varying proportionately to the square root of the instantaneous magnitudes of the deflecting potential.

9. In electrocardiography, the method of drawing a plurality of component action voltages from tapping points on the body of a patient encircling the heart and being related to each other in the manner of a multi-phase electric system, whereby the vectorial resultant of the voltages drawn from each two adjacent tapping points is representative of the instantaneous resultant electric vector of the action potentials generated by the heart action, producing voltages having instantaneous magnitudes varying according to the square of the instantaneous magnitudes of the action voltages drawn, additively combining the squared voltages and recording the magnitudes of said combined voltage at each instant during the cardiac cycle.

HANS ERICH HOLLMANN.